May 20, 1924.  
H. T. THOMAS  
1,494,647  
OILING SYSTEM FOR AUTOMOBILE ENGINES  
Filed July 25, 1921  4 Sheets-Sheet 1

INVENTOR.  
*Horace T. Thomas.*  
BY *Ralzemond A. Parker*  
ATTORNEY.

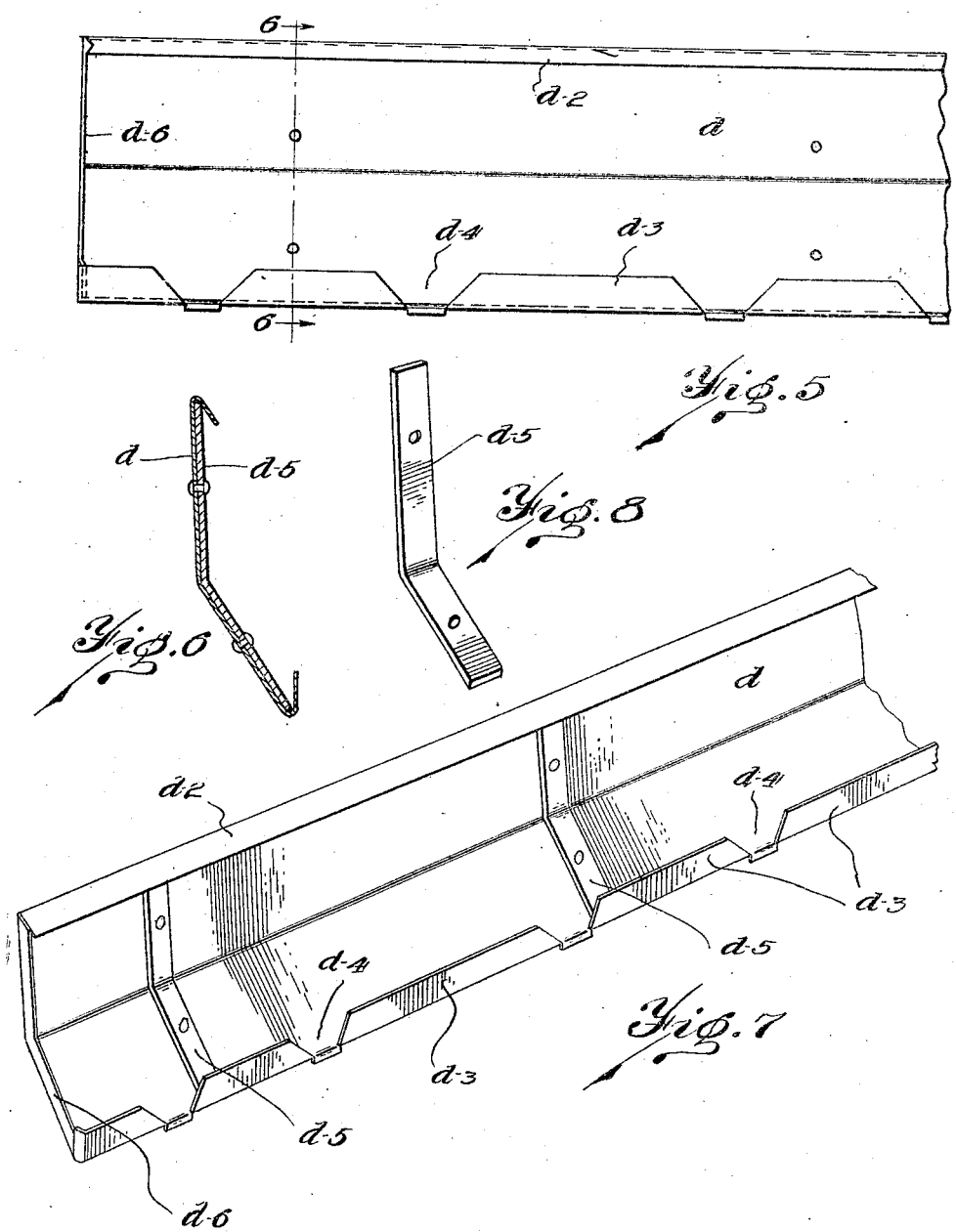

Patented May 20, 1924.

1,494,647

UNITED STATES PATENT OFFICE.

HORACE T. THOMAS, OF LANSING, MICHIGAN.

OILING SYSTEM FOR AUTOMOBILE ENGINES.

Application filed July 25, 1921. Serial No. 487,324.

*To all whom it may concern:*

Be it known that I, HORACE T. THOMAS, citizen of the United States, residing at Lansing, county of Ingham, State of Michigan, have invented a certain new and useful Improvement in Oiling Systems for Automobile Engines, and declare the following to be a full, clear, and exact description of the same, such as will enable others skilled in the art to which it pertains to make and use the same, reference being had to the accompanying drawings, which form a part of this specification.

My invention relates to an oiling system for automobile engines.

In the accompanying drawings:

Fig. 4 is a perspective view of the oil shielding strip.

Fig. 5 is an elevation of the oil distributing plate.

Fig. 6 is a section on the line VI—VI Fig. 5.

Fig. 7 is a perspective view of a portion of the oil distributing plate.

Fig. 8 is a perspective view of the securing rib of the oil distributing plate.

$a$ is the crank case; $a^2$ the oil well or oil-receptacle portion of the crank case; $a^3$ is the crank; $a^4$ the connecting rod and $a^5$ the dipper extending downwardly from the lower end of the connecting rod. These are conventional constructions.

$b$ is the oil receiving pan. This is provided with transverse depressions $b^2$ in its upper surface. The oil is forced from the receptacle $a^2$ to the different bearings in the crank case and falls from said bearings upon the surface of the pan $b$ and flows therefrom into the depressions $b^2$.

Figure 1:
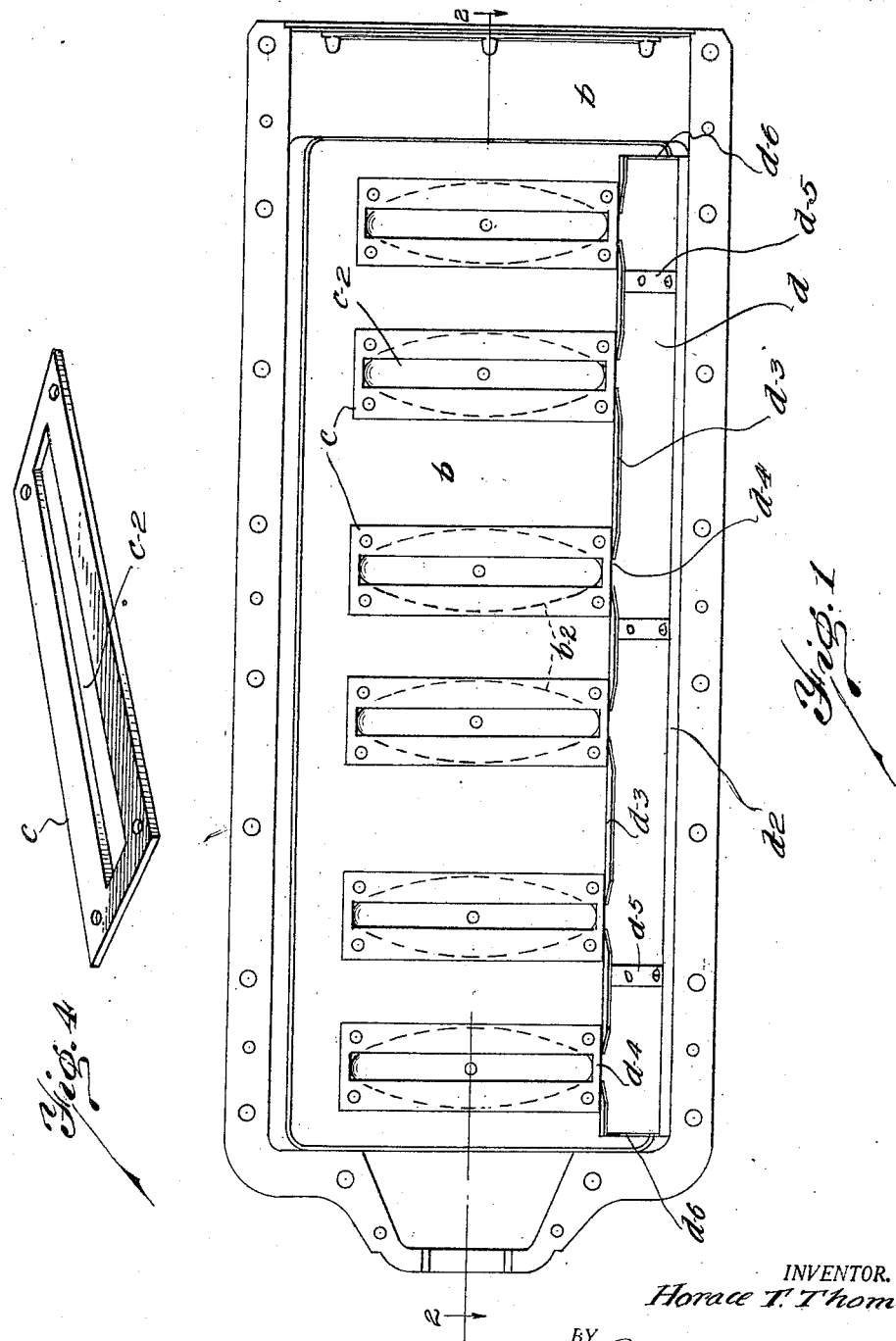
Fig. 1 is a plan view of the oil receiving pan.
Figure 2:
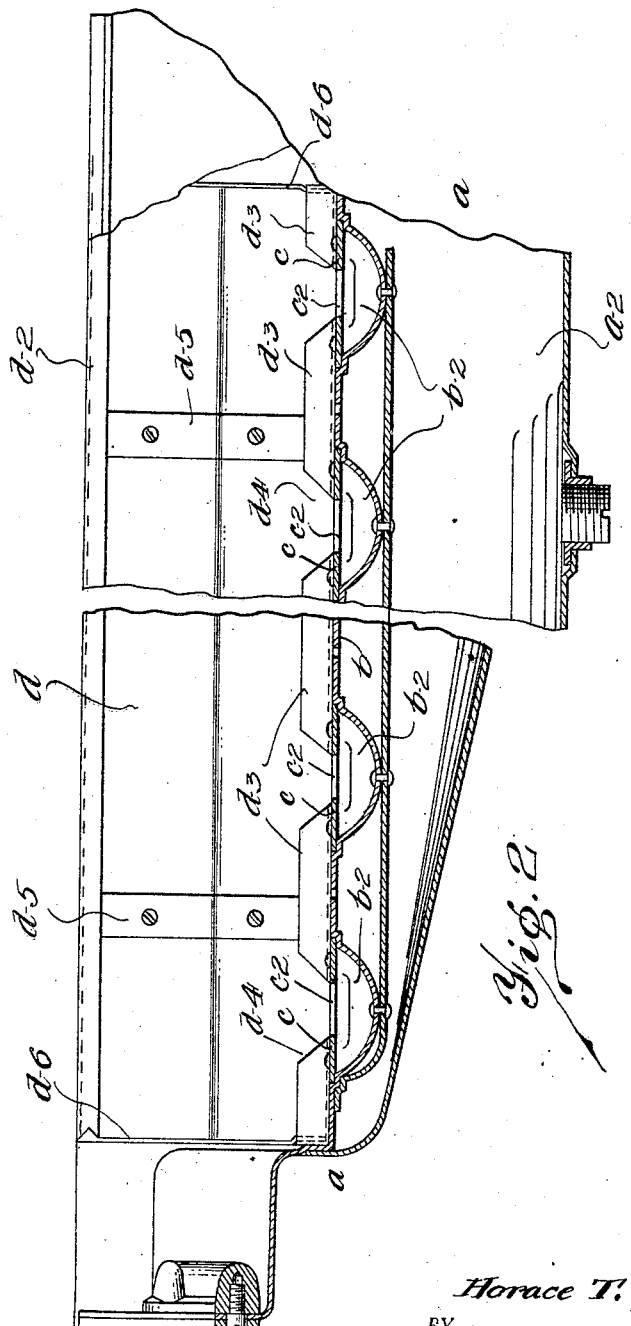
Fig. 2 is a section to an enlarged scale of a part of the lower portion of the crank case.

$c$ is a rectangular plate having a longitudinal slot $c^2$ therein. A plate $c$ is placed over each of the depressions $b^2$ so that the slot shall extend the length of said depression concentric therewith and the plate shall partly cover said depression upon each side, the slot being of sufficient breadth and length to permit the dipper $a^5$ to enter therein and dip into the oil and spray it, during the revolution of the crank. The plate $c$ is preferably sunk into the surface of the oil receiving plate $b$ as indicated in Fig. 2 so that the oil which falls on the surface of the latter shall flow without obstruction into a slot $c^2$ and into the receptacle $b^2$. The plate $c$ partly covers the receptacle $b^2$ upon both sides so that as the dipper passes through said depression and slot, the oil which would otherwise be thrown up laterally is obstructed by the side portions of the plate $c$ and returns to the bottom of the receptacle.

Figure 3:
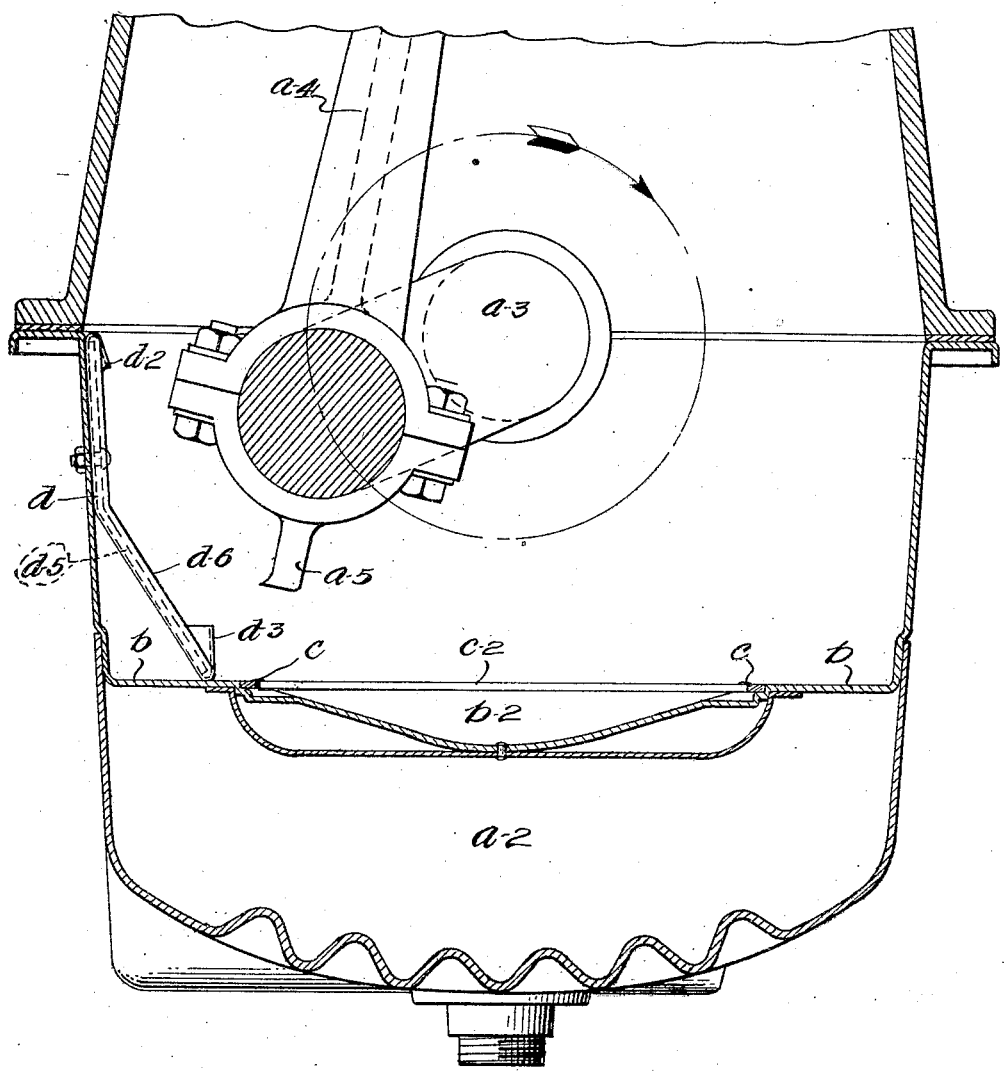
Fig. 3 is a cross section of the same showing also a crank and part of a connecting rod.

$d$ is a plate, the form of which is distinctly shown in the drawings. The plate $d$ is secured upon that side of the crank case toward which the crank $a^3$ turns as clearly shown in Fig. 3, and is bent outward at its lower part as shown in Fig. 3 to bring its lower edge adjacent to the oil receptacle $b^2$. The plate $d$ is turned over at its upper edge as indicated in Fig. 2 to catch the oil thrown against said plate which would otherwise flow over its upper edge. Said plate is turned upward at its ends as indicated at $d^6$.

The plate $d$ is notched at intervals as indicated at $d^4$ at its lower edge and the portion of its edge between said notches is turned upward to form a trough as indicated at $d^3$. When the plate $d$ is secured in place, a notch $d^4$ comes opposite each of the slots $c^2$.

The operation of the above described device is as follows:

As the crank shaft revolves, the dipper $a^2$ passes through a slot $c^2$ and throws the oil laterally against the plate $d$. The oil thus thrown against the plate is prevented from flowing over the upper edge of said plate as above described by the overturned upper edge and flows by gravity downward to be received by the upturned lower edge $d^3$ and constrained to flow through the notches or openings $d^4$ immediately adjacent to the slots $c^2$ through which slots the oil returns immediately to the receptacle $b^2$.

Claims:

1. In an apparatus of the kind described, a sheet metal oil pan having a depression $b^2$ therein, a sheet metal strip separate from said pan secured to and lying flat upon the surface of said pan, its edge extending over the edge of said depression, for the purpose described.

1. In an apparatus of the kind described, a sheet metal oil pan having a depression $b^2$ therein, a sheet metal strip separate from said pan secured to and lying flat upon the surface of said pan upon each side of said depression, its edge extending over the edge of said depression, for the purpose described.

3. In apparatus of the kind described, an oil pan having a depression $b^2$ therein, a sheet metal plate located upon one side of said pan and having its lower edge turned upward to form a trough parallel to the surface of said pan, said up-turned edge being cut away to form a discharge passage for oil at a point adjacent to the end of said depression.

4. In apparatus of the kind described, an oil pan having a depression $b^2$ therein, a sheet metal plate located upon one side of said pan and having its lower edge turned upward to form a trough parallel to the surface of said pan, said up-turned edge being cut away to form a discharge passage for oil at a point adjacent to the end of said depression, the upper edge of said plate being also turned over to form an inverted trough, for the purpose described.

5. In apparatus of the kind described, an oil pan having a depression $b^2$ therein, a sheet metal plate located upon one side of said pan and having its lower edge turned upward to form a trough parallel to the surface of said pan, said up-turned edge being cut away to form a discharge passage for oil at a point adjacent to the end of said depression, in combination with the strips $c$, substantially as and for the purpose described.

6. In an apparatus of the kind described, an oil pan having a plurality of parallel depressions $b^2$, a sheet metal plate located in an upright position at one side of said pan and having its lower edge up-turned to form a trough parallel to the surface of said pan extending past and adjacent to the ends of said depressions, said up-turned portion being cut away to form a discharge passage for the oil opposite the end of each of said depressions, substantially as and for the purpose described.

In testimony whereof, I sign this specification.

HORACE T. THOMAS.